United States Patent [19]

Anderson

[11] 4,366,030
[45] Dec. 28, 1982

[54] SUBATMOSPHERIC PRESSURE DISTILLATION AND/OR COOLING METHOD AND MEANS

[76] Inventor: Max F. Anderson, Stewardson, Ill. 62463

[21] Appl. No.: 84,373

[22] Filed: Oct. 12, 1979

[51] Int. Cl.³ .................................................. B01D 3/10
[52] U.S. Cl. ..................................... 203/11; 202/196; 202/205; 202/234; 202/235; 203/91
[58] Field of Search ............... 202/152, 163, 164, 167, 202/176, 177, 179, 181, 182, 185 R, 185 A, 188, 192–196, 198, 205, 232–236; 203/10, 11, 90, 91, 100, DIG. 1, DIG. 17, 1

[56] References Cited

U.S. PATENT DOCUMENTS

| | | | |
|---|---|---|---|
| 491,028 | 1/1893 | Thomas et al. | 202/185 C |
| 2,490,659 | 12/1949 | Snyder | 202/205 |
| 4,172,767 | 10/1979 | Sear | 202/234 |

Primary Examiner—Frank Sever
Attorney, Agent, or Firm—Victor R. Beckman

[57] ABSTRACT

Method and apparatus for distillation of liquids such as sea water, brackish water, waste water, or the like, which also may be used for cooling purposes, are disclosed. The apparatus includes a vacuum tank, or vessel, into which liquid to be distilled, such as saline water, is fed to partially fill the tank. If desired, heating means may be included for heating the liquid adjacent the surface thereof to promote evaporation thereof. Vapor from the region above the liquid surface is fed to vapor condensing means adjacent the bottom of the tank for condensing the same. A condensate discharge tube extends downwardly from the condensing means for discharge of condensate therefrom. Means including a pressure head of condensate within the condensate discharge tube maintains a subatmospheric pressure within the tank to promote evaporation of liquid contained therein. A drain tube may be included which extends downwardly from the tank for use in draining sludge, froth, concentrated saline solution, or the like, from the tank. A pressure head of liquid is contained in said drain tube to maintain the tank at the subatmospheric pressure. Cold liquid adjacent the bottom of the tank may be used for external cooling purposes, if desired.

9 Claims, 4 Drawing Figures

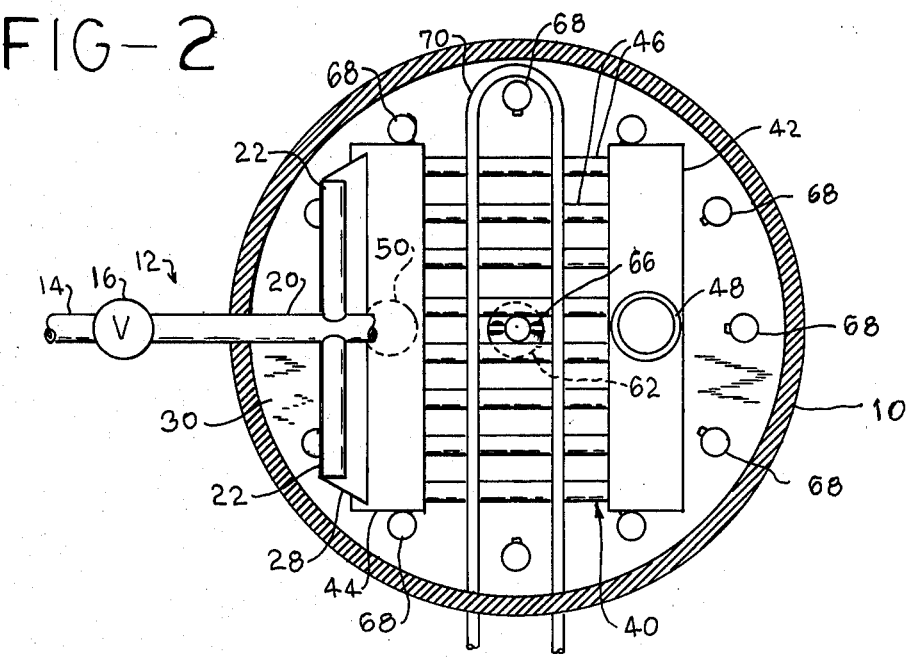
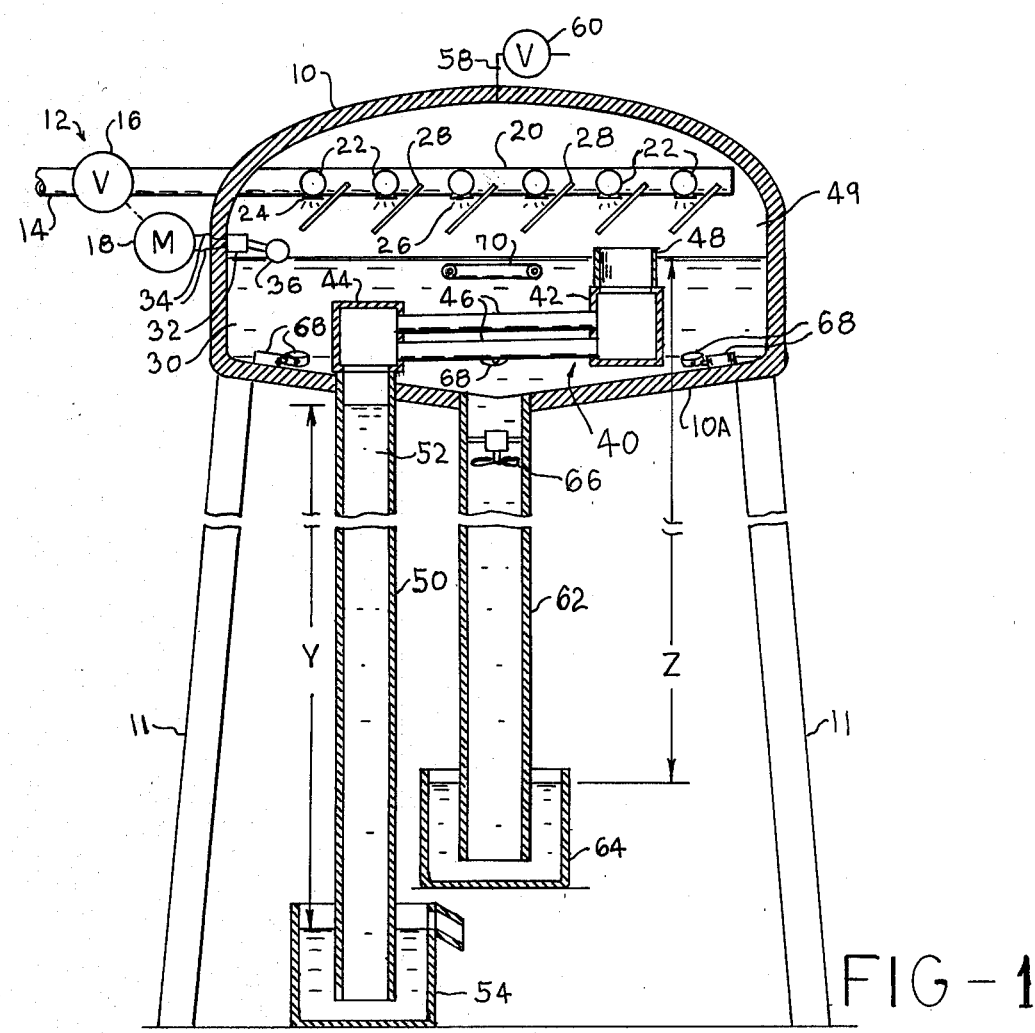

4,366,030

SUBATMOSPHERIC PRESSURE DISTILLATION AND/OR COOLING METHOD AND MEANS

BACKGROUND OF THE INVENTION

Distillation means, including solar distillation means, for distillation of, say, ocean water are well known as shown in U.S. Pat. Nos. 3,257,291; 3,317,406; 3,775,257; 4,046,639; 4,110,172; 4,118,283, and numerous other patents. None, however, make use of a vacuum tank, or container, for the liquid, and a discharge tube containing a liquid column supported by atmospheric pressure extending downwardly from the tank for maintaining a subatmospheric pressure within the vessel above the liquid surface.

SUMMARY OF THE INVENTION AND OBJECTS

An object of this invention is the provision of improved method and means for low pressure distillation of liquids such as salt water, waste water, brackish water, and the like.

An object of this invention is the provision of method and means of the above-mentioned type which include novel vacuum maintenance means for maintaining a low pressure region above the surface of the liquid to be distilled to facilitate evaporation thereof.

An object of this invention is the provision of method and means of the above-mentioned type for use in cooling.

The above and other objects and advantages are achieved by use of a fluid-tight vacuum tank, or container, into which liquid to be distilled, such as saline water, is introduced to partially fill the same. Heating means may be provided for heating liquid fed into the vacuum tank to promote evaporation thereof for increased production of liquid vapor in the region above the liquid surface. Vapor from the region above the liquid surface is supplied to surface condensing means adjacent the bottom of the tank to condense vapor for the production of condensate. A condensate discharge tube extends downwardly from said condensing means which tube contains a column of condensate supported by atmospheric pressure at the lower end of the tube. The pressure head provided by the column of condensate maintains the region above the liquid surface in the vacuum tank at subatmospheric pressure to promote evaporation and cooling of the liquid. The vacuum tank also may be provided with an elongated downwardly extending drain tube containing a column of the liquid, which column also is supported by atmospheric pressure for maintenance of the low pressure within the tank. The upper end of the drain tube may terminate adjacent the bottom of the vacuum tank for use in removing sludge and bottom deposits from the tank, or may terminate adjacent the liquid surface within the tank to function as an overflow for removal of froth and other surface materials, and/or inpurities from the liquid surface.

The invention, as well as other objects and advantages thereof, will become apparent from the following detailed description considered with the accompanying drawings.

BRIEF DESCRIPTION OF THE DRAWINGS

In the drawings, wherein like reference characters refer to the same parts in the several views:

FIG. 1 is a diagrammatic side elevational view, with parts shown broken away for clarity, of a novel distillation and cooling system embodying the present invention;

FIG. 2 is a diagrammatic plan view of the system illustrated in FIG. 1, with a portion of the vacuum tank and liquid supply system shown broken away for clarity;

Figure 3:
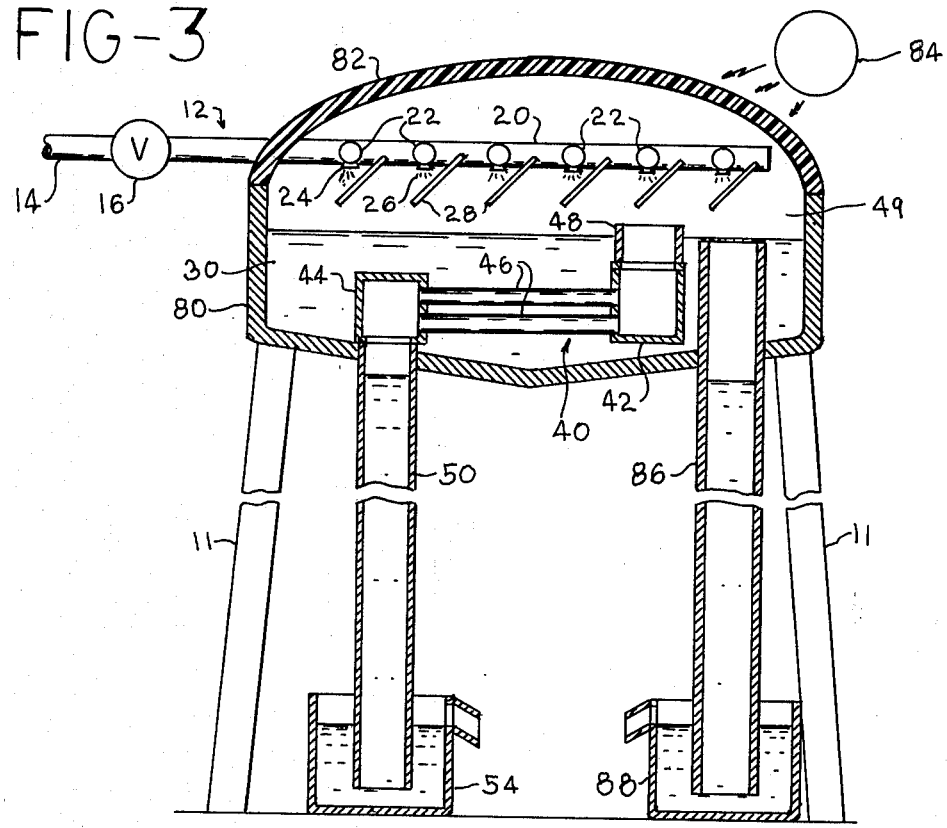
FIG. 3 is a diagrammatic view which is similar to that of FIG. 1 but showing a modified form of this invention wherein an overflow drain tube is provided for removal of surface liquid from the vacuum container.

Reference first is made to FIGS. 1 and 2 wherein a novel distillation and/or cooling system which embodies the present invention is shown comprising a fluid-tight vacuum tank, or container, 10 supported at an elevated position as by means of legs 11, two of which are shown in FIG. 1. Liquid to be distilled, such as industrial or municipal waste water, sea or saline water, or the like, is fed to the tank from a source, not shown, through a liquid supply system identified generally by reference numeral 12. The supply system 12 includes supply line 14, and a valve 16 in the line, which valve is under control of valve operator motor 18 for controlling the supply of liquid to the tank. In the illustrated arrangement, the liquid is supplied to a manifold 20 having a plurality of distribution tubes 22 extending laterally thereof, the free ends of which are closed. Apertures are formed along the laterally extending tubes which may be provided with nozzles 24 from which a spay 26, or trickle, of liquid issues when the valve 16 is opened. If desired baffles 28 may be attached to the manifold over which liquid from the nozzles flows to facilitate evaporation thereof. It here will be noted that the liquid supply system shown in the drawings is for purposes of illustration only, the invention not being limited to the illustrated arrangement.

The vacuum tank 10 is partially filled with liquid 30 to be distilled. In the FIGS. 1 and 2 arrangement, the liquid level is controlled by a float-operated electrical device 32 connected to the valve operator 18 through lines 34. A float 36 on a pivot arm extending from the device 32 controls the same for control of the valve operator 18 for opening the valve 16 when the float drops below a predetermined liquid level and for closing the same to shut off the flow of liquid into the vacuum tank when a predetermined liquid level is reached.

Vapor condensing means 40, in the form of a surface condenser, is located adjacent the bottom of the vacuum tank 10 below the surface of liquid 30. For purposes of illustration, the condenser is shown to comprise inlet and outlet manifolds 42 and 44, respectively, between which a plurality of vapor tubes 46 extend. An upwardly extending vapor inlet passage, or conduit, 48 at the inlet manifold 42 provides communication between the condenser 40 and the vapor-laden region 49 above liquid surface. In accordance with one aspect of the present invention, the condenser outlet manifold 44 is connected to the upper end of an elongated, downwardly extending condensate discharge tube 50 within which a column of liquid condensate 52 is supported by atmospheric pressure transmitted to the lower end of the tube. In the arrangement illustrated in FIGS. 1 and 2, the lower end of the tube 50 is disposed in a pool of condensate within a container 54. It will be understood that the tube 50 not only serves as discharge means for condensate from the condenser 40, but the column of condensate contained therein comprises a pressure head which functions to maintain the region 49 above the liquid surface at subatmospheric pressure.

To prepare the system for operation, air is first evacuated from the region 49 by any suitable means not shown. For example, air may be removed from the tank 10 through a line 58 and valve 60 at the top of the tank. Once air has been evacuated from the tank, the valve 60 is closed and the low pressure region so-established is maintained by the column of condensate, with pressure head Y, discharge tube 50. The magnitude of the pressure head depends upon the density of the liquid column as well as the difference between atmospheric pressure and the pressure within low pressure region 49. Where the condensate is water, as in the case of distillation of saline water, for example, a pressure head on the order of, say 31.5 feet may be expected. Preferably, the top of the condensate column within the tube 50 is located at or below the bottom of the tank 10 so only vapor to be condensed is contained within the portion of the discharge tube extending into the tank.

Depending upon the liquid supplied to the system for distillation, a build-up of sludge, or the like, may be produced at the bottom of the tank. In the arrangement illustrated in FIGS. 1 and 2, sludge removal is facilitated by providing the vacuum tank with a funnel shaped bottom 10A, the lower end of which terminates in an elongated sludge discharge tube 62. In the illustrated arrangement the lower end of the tube 62 is disposed in a pool of the liquid within a container 64. A column of liquid with a pressure head Z, supported by atmospheric pressure, is provided in the same manner as condensate pressure head Y, described above. In this case, the liquid head extends to the level of the liquid within the tank 10, rather than terminating inside the tube. The density of the liquid may differ from that of the condensate obtained therefrom such that the pressure head Z may differ from pressure head Y.

If desired, or required, a motor operated impeller 66 may be located inside the tube 62 for urging the liquid and sludge downwardly into the container 64 for cleaning the tank of sludge. Sludge may be removed from container 64 by any suitable means, not shown. Also, nozzles 68 may be included inside the tank 10 adjacent the bottom 10A thereof, to which liquid under pressure may be supplied from a source, not shown, for sweeping the bottom of the tank with streams of liquid issuing from the nozzles. Nozzles of the oscillating type may be used to increase the sweep angle without loss of stream pressure.

To facilitate evaporation of the liquid 30, heating means 70 may be included for heating the liquid surface. Any conventional heating means such as hot water or steam, electric or solar heat, or the like, may be used. In FIGS. 1 and 2, the heating means is shown comprising a loop of pipe through which hot fluid is circulated from any desired source, not shown, for heating the liquid 30 at the surface thereof. Heating also may be required to prevent freezing of the liquid 30 within the vacuum tank.

Reference now is made to FIG. 3 of the drawings wherein a distillation system is shown which is similar to that shown in FIGS. 1 and 2, and components which are common to the different embodiments will not be described again. The FIG. 3 arrangement includes a vacuum tank 80 similar to tank 10, except the top of the tank is provided with a light-transmitting window 82 through which solar energy, from sun 84, is transmitted for heating the liquid 30 to facilitate evaporation from the surface thereof. Such solar heating may be used in conjunction with other heating means, such as heating means 70 shown in FIGS. 1 and 2, if desired.

Another difference in the arrangement of FIGS. 1 and 2 and that of FIG. 3 involves the use of a liquid discharge tube 86 having an upper end which terminates at the surface of the liquid 30 to function as an overflow tube through which surface material from adjacent the liquid surface may be discharged. As with the condensate discharge tube 50, tube 86 also terminates in a pool of liquid in container 88 for support of a column of liquid therewithin. With this arrangement a substantially continuous flow of liquid into, and out of, the vacuum tank is provided. The flow of liquid into the tank is adjusted to provide for the desired overflow therefrom, and no float-controlled valve is required. Froth, if produced, is readily removed from the liquid surface using this embodiment of the invention. Also, the system is well adapted for distillation of salt water since the concentrated salt solution, or brine, is continually drained from the surface to reduce the salt concentration of the liquid.

Figure 4:
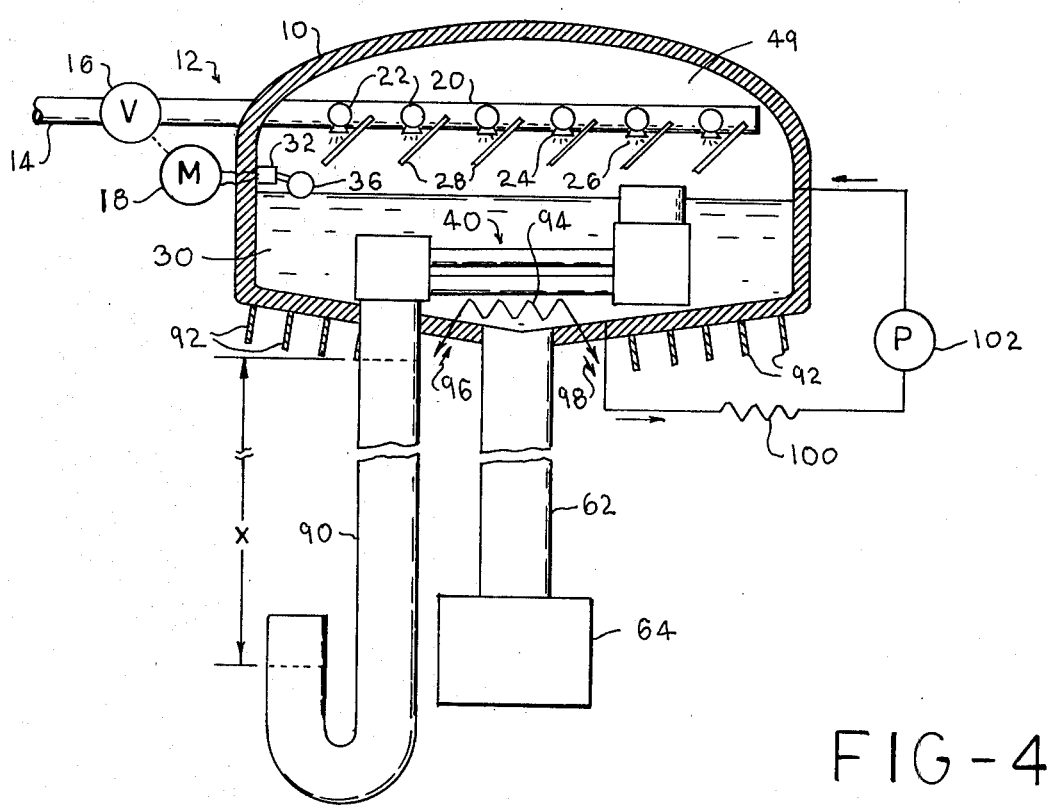
FIG. 4 is a diagrammatic view which is similar to that of FIGS. 1 and 3 but showing another embodiment of this invention which includes a modified form of discharge tube, and various heat exchange means for heat transfer to the liquid.

Reference now is made to FIG. 4 wherein another modified form of this invention is shown which is particularly adapted for cooling purposes. The tank 10, water supply system 12, and condensing means 40 may be of the same general type shown in FIGS. 1 and 2 and described above. In FIG. 4 a modified form of discharge tube is employed. Instead of terminating the lower end of the discharge tube in a pool of liquid, a U-shaped tube may be used, such as tube 90 shown in FIG. 4. The one end of tube 90 communicates with the condensing means 40, and the opposite end is open to the atmosphere. Here, a pressure head X, provided by the column of condensate within the tube, is maintained. As condensate is produced, it is discharged from the lower end of the tube 90. It will be apparent that other discharge tubes may be of the same U-shaped type, if desired.

The FIG. 4 embodiment also illustrates, in simplified diagrammatic form, several means of using the liquid 30 for cooling purposes. One such means includes the use of external fins 92 at the base of the tank. The tank bottom and fins 92 may be directly located in a region to be cooled, with the warmer upper portion of the tank extending outside such region. Heat is transferred directly to the fins and tank bottom for cooling of the adjacent region. Alternatively heat exchange means 94 may be located within the tank adjacent the bottom of the liquid 30. Liquid circulated through the heat exchanger, as in the direction of arrows 96 and 98 is thereby cooled, and any desired use, not shown, may be made thereof. Another means of cooling involves pumping the colder liquid 30 from the bottom of the tank 10 through a heat exchanger 100 as by use of pump 102. The region surrounding the heat exchanger 100 is cooled, and the warmed liquid is circulated back into the tank. If desired, the liquid may be returned to the tank in the form of a spray, in the manner of liquid supply system 12, to facilitate evaporation thereof. When the system is intended primarily for cooling purposes, the liquid condensate obtained from the system may be of secondary consideration, or importance. Obviously, condensation is required for removal of vapor from the region 49 within the tank to allow for continuous evaporation of the liquid.

Although the operation of the distillation and cooling system of this invention is believed to be apparent from the above description, a brief description of the operation of the FIGS. 1 and 2 arrangement now will be given. As noted, the system operates at a reduced, subatmospheric, pressure within the region 49 above the surface of liquid 30 in vacuum tank 10. Any suitable means may be used for initial evacuation of air from the tank. For example, air may be removed from the tank by use of a vacuum pump connected thereto through line 58 and valve 60 at the top of the tank. Alternatively, with the discharge tubes 50 and 62 blocked adjacent their lower ends, as by use of valves, or the like, not shown, and with valve 60 opened to allow for the escape of air from the tank, the tank may be filled to the top with liquid, at which time the valve is closed. When the discharge tube passages are opened the liquid level in the tank will drop leaving a vacuum therewithin. Pressure heads Y and Z are thereby produced to maintain a subatmospheric pressure condition within the tank. As noted above, pressure heads on the order of, say, 31.5 feet may be provided, and discharge tubes of sufficient length to accomodate said pressure heads must be employed.

Liquid quickly evaporates from the liquid surface, and the vapor enters condensing means 40 through inlet tube 48 which extends above the liquid surface into region 49. At condensing means 40 the vapor is cooled and condenses, and the condensate flows downwardly into discharge tube 50 for discharge from the lower end thereof. The column of distillate within the tube 50 blocks direct communication of the low pressure region 49 with the ambient atmosphere to maintain a subatmospheric pressure condition within the vacuum tank 10, while, at the same time, providing for discharge of condensate from the system.

As distillation proceeds, liquid is added to the vacuum tank through supply system 12 to maintain the liquid level within the tank. The temperature gradient within the liquid 30, wherein the liquid adjacent the surface where evaporation takes place is warmer than liquid at the bottom of the tank surrounding condensing means 40, results in continuous distillation of the liquid and removal of the condensate from the tank through the condensate discharge tube 50.

Liquid discharge tubes for draining material from either the bottom of the tank (through discharge tube 62 in the FIGS. 1 and 2 embodiment) of from the liquid surface (through discharge tube 86 in the FIG. 3 embodiment) may be provided. As with the condensate discharge tube 50, a pressure head of the liquid is provided to block the flow of air into the tank, yet allow for the drainage of sludge, froth, brine, or the like, from the tank.

Also, gases other than water vapor may accumulate in the vacuum tank in which case the occasional removal thereof for efficient operation of the system may be required.

The invention having been described in detail in accordance with requirements of the U.S. Patent Statues, various other changes and modifications will suggest themselves to those skilled in this art, which changes and modifications are intended to fall within the spirit and scope of the invention as defined in the appended claims.

I claim:

1. A distillation system comprising
   a vacuum tank at subatmospheric pressure,
   liquid supply means for supplying liquid to be distilled to said tank to partially fill the same,
   condensing means inside said tank adjacent the tank bottom for condensing vapor contained within the tank,
   condenser inlet means providing communication between said surface condensing means and the subatmospheric pressure interior of the tank above the surface of liquid partially filling the tank for passage of vapor contained within the tank above the liquid surface to said condensing means, and
   means for removing condensate from said condensing means while maintaining a subatmospheric pressure within the tank.

2. A distillation system as defined in claim 1 including an elongated liquid discharge tube extending downwardly from said vacuum tank and containing a column of liquid supported by atmospheric pressure through which liquid contained in said tank is removed, the upper end of said elongated tube terminating intermediate the top and bottom of the tank for liquid overflow from the tank through said liquid discharge tube.

3. A distillation system as defined in claim 2 for distillation of saline water, saline water of high salt content being removed from the tank by overflow through said liquid discharge tube.

4. A distillation system as defined in claim 1 including heating means within the tank in the liquid adjacent the liquid surface for heating liquid within said tank to promote evaporation from the liquid surface.

5. A distillation system as defined in claim 1 wherein said tank includes a light-transmitting tank top for passage of solar energy for solar heating of the surface of the liquid within the tank.

6. In a distillation process, the elements comprising,
   feeding liquid to be distilled into a vacuum tank from which air is removed to partially fill the tank with said liquid,
   evaporating liquid fed into the tank to provide a vapor thereof within said tank,
   cooling vapor by condensing means located inside the vacuum tank in the liquid adjacent the bottom of the tank for condensing at least a portion of said vapor, and
   removing condensate from said condensing means while maintaining vapor pressure within the vacuum tank at a subatmospheric level.

7. A distillation process as defined in claim 6 including,
   removing liquid from the partially filled tank of liquid through an overflow tube containing an atmospheric pressure-supported column of said liquid while maintaining vapor pressure within the vacuum tank at a subatmospheric level.

8. A distillation system comprising
   a closed chamber containing fluid in liquid and vapor form,
   condensing means within said chamber adjacent the bottom thereof within the liquid therein for condensing vapor contained in the chamber, said condensing means having a vapor inlet above the liquid surface in the chamber and a condensate outlet outside said chamber, and means for preventing air flow into said chamber through said condensing means while allowing for the removal of condensate through the condensate outlet.

9. In a distillation process the steps comprising, partially filling a vacuum tank with liquid to be distilled, from which tank air is removed, evaporating liquid contained in the tank to provide a vapor thereof within said tank above the surface of the liquid, passing vapor from above the liquid surface into condensing means located within the liquid inside the tank adjacent the tank bottom for cooling and condensing at least a portion of the vapor, and removing condensate from said condensing means.

* * * * *